(12) United States Patent
Perronnin

(10) Patent No.: US 7,756,341 B2
(45) Date of Patent: Jul. 13, 2010

(54) GENERIC VISUAL CATEGORIZATION METHOD AND SYSTEM

(75) Inventor: Florent Perronnin, Gieres (FR)

(73) Assignee: Xerox Corporation, Norwalk, CT (US)

( * ) Notice: Subject to any disclaimer, the term of this patent is extended or adjusted under 35 U.S.C. 154(b) by 1217 days.

(21) Appl. No.: 11/170,496

(22) Filed: Jun. 30, 2005

(65) Prior Publication Data

US 2007/0005356 A1 Jan. 4, 2007

(51) Int. Cl.
*G06K 9/62* (2006.01)
(52) U.S. Cl. .................. 382/224; 382/176; 704/245
(58) Field of Classification Search .............. 382/224; 704/245
See application file for complete search history.

(56) References Cited

U.S. PATENT DOCUMENTS

| | | | | |
|---|---|---|---|---|
| 5,745,601 | A * | 4/1998 | Lee et al. | 382/225 |
| 5,963,670 | A * | 10/1999 | Lipson et al. | 382/224 |
| 6,092,059 | A * | 7/2000 | Straforini et al. | 706/14 |
| 6,513,005 | B1 * | 1/2003 | Qin et al. | 704/254 |
| 6,549,660 | B1 * | 4/2003 | Lipson et al. | 382/224 |
| 6,741,756 | B1 * | 5/2004 | Toyama et al. | 382/291 |
| 7,006,250 | B2 * | 2/2006 | Denton et al. | 358/1.9 |
| 7,286,710 | B2 * | 10/2007 | Marpe et al. | 382/239 |
| 2002/0168097 | A1 | 11/2002 | Neubauer et al. | |
| 2003/0200085 | A1 * | 10/2003 | Nguyen et al. | 704/238 |
| 2004/0075645 | A1 * | 4/2004 | Taylor et al. | 345/157 |
| 2004/0190789 | A1 * | 9/2004 | Liu et al. | 382/274 |
| 2008/0137986 | A1 * | 6/2008 | Liu et al. | 382/274 |

FOREIGN PATENT DOCUMENTS

| | | |
|---|---|---|
| EP | 0685814 A2 | 12/1995 |
| EP | 0685814 A3 | 3/1997 |

OTHER PUBLICATIONS

Nowak, E. et al., "Sampling Strategies for bag-of-features Image Classification", 9th European Conference on Computer Vision, Proceedings Part IV, Lecture Notes in Computer Science vol. 3954, Germany, 2006, pp. 490-503.
European Search Report for EPO Counterpart Application No. EP 06 11 5147, Jul. 27, 2006.
Burges, Christopher "A Tutorial on Support Vector Machines for Pattern Recognition", in Data Mining and Knowledge Discovery, vol. 2, pp. 121-167, 1998.
Csurka, Dance, Fan, Willamowski and Bray, "Visual Categorization With Bags-Of-Keypoints", Proc. ECCV International Workshop on Statistical Learning in Computer Vision, 2004.

(Continued)

*Primary Examiner*—Daniel G Mariam
*Assistant Examiner*—Aklilu K Woldemariam
(74) *Attorney, Agent, or Firm*—Fay Sharpe LLP

(57) ABSTRACT

Generic visual categorization methods complement a general vocabulary with adapted vocabularies that are class specific. Images to be categorized are characterized within different categories through a histogram indicating whether the image is better described by the general vocabulary or the class-specific adapted vocabulary.

20 Claims, 6 Drawing Sheets

OTHER PUBLICATIONS

Dance, Willamowski, Csurka and Bray, "Categorizing Nine Visual Classes with Bags of Keypoints", Pascal Vision Workshop 2004, Montbonnot, France May 3-5, 2004.

Delponte, Elisabetta "Local Image Descriptors For Matching And Classification", available on the Internet at http://www.disi.unige.it/dottorato/DOTTORANDI/DelponteE/04-proposta, dated Dec. 2004.

Dempster, Laird, and Rubin, "Maximum Likelihood From Incomplete Data Via The EM Algorithm", Journal of the Royal Statistical Society, vol. 39(1), pp. 1-38, 1977.

Farquhar, Szedmak and Meng, "Improving Bag-Of-Keypoints Image Categorization: Generative Models And P-Kernels", LAVA Report, available on the Internet at http://www.ecs.soton.ac.uk, Feb. 17, 2005.

Fei-Fei, Fergus and Perona, "A Bayesian Approach to Unsupervised One-Shot Learning of Object Categories", Proc. ICCV, 2003.

Leggetter and Woodland, "Maximum Likelihood Linear Regression for Speaker Adaptation of Continuous Density Hidden Markov Models", Computer Speech and Language, issue 9, pp. 171-185, 1995.

Lowe, David "Object Recognition From Local Scale-Invariant Features", ICCV (International Conference on Computer Vision), 1999.

Mikolajczyk, Tuytelaars, Schmid, Zisserman, Matas, Schaffalitzky, Kadir, Van Gool, "A Comparison Of Affine Region Detectors", International Journal of Computer Vision, available on the Internet at http://lear.inrialpes.fr/pubs/, 2005.

Mikolajczyk and Schmid, "An Affine Invariant Interest Point Detector", ECCV, 2002.

Mikolajczyk and Schmid, "A Performance Evaluation Of Local Descriptors", Proceedings of the Conference on Computer Vision and Pattern Recognition (CVPR), Madison, Wisconsin, USA, Jun. 2003.

Murphy, Kevin "Models For Generic Visual Object Detection", available on the Internet at http://www.cs.ubc.ca/~murphyk/Papers/GMobjRec.pdf, May 11, 2005.

Reynolds, Quatieri and Dunn, "Speaker Verification Using Adapted Gaussian Mixture Models", in Digital Signal Processing, vol. 10, pp. 19-41, 2000.

Sankar, Ananth "Experiments With A Gaussian Merging-Splitting Algorithm for HMM Training For Speech Recognition", Proceedings of the 1997 DARPA Broadcast News Transcription and Understanding Workshop, pp. 99-104, 1998.

* cited by examiner

GENERIC VISUAL CATEGORIZATION METHOD AND SYSTEM

BACKGROUND AND SUMMARY

The following relates generally to methods, apparatus and articles of manufacture therefor, for categorizing images.

Since the advent of digital image sensors, the number of collections of digital images continues to rise. Generic visual categorization provides access to high-level class information about objects contained in images for managing, searching, and mining such collections. Categorization of image content through generic visual categorization involves generalizing over natural variations in appearance inherent in a category of elements (e.g., objects, animals, etc.), and over viewing and imaging conditions. Unlike categorization methods for individual categories or object types, such as faces or cars, generic visual categorization systems handle multiple object types simultaneously.

One existing approach for performing generic visual categorization is an example-based machine learning approach known as the "bag of keypoints" approach, which makes use of a "visual vocabulary" to provide a mid-level characterization of images for bridging the semantic gap between low-level features and high-level concepts. The visual vocabulary is estimated in an unsupervised manner by clustering a set of training samples (i.e., low level features extracted from training images). To characterize an image, each of its feature vectors is assigned to its closest cluster and a single occupancy histogram is built. The image is classified by providing the single occupancy histogram to a set of Support Vector Machine (SVM) classifiers (i.e., one per class), trained in a one versus all manner.

Additional details and background of the bag of keypoints approach, and alternatives thereof, are disclosed in the following publications, which are incorporated herein by reference in their entirety: Csurka, Dance, Fan, Willamowski and Bray, "Visual Categorization With Bags-Of-Keypoints", Proc. ECCV International Workshop on Statistical Learning in Computer Vision, 2004; and Farquhar, Szedmak and Meng, "Improving Bag-Of-Keypoints Image Categorization: Generative Models And P-Kernels", LAVA Report, available on the Internet at www.ecs.soton.ac.uk, dated Feb. 17, 2005.

In accordance with the disclosure herein, there is provided an improved generic visual categorizer in which a vocabulary of visual words and an occupancy histogram are derived for each class. Each class vocabulary is derived by merging a general vocabulary and an adapted vocabulary for the class, which adapted vocabulary is adapted from the general vocabulary. The occupancy histogram developed for each class is employed to classify an image as one of being either more suitably described by the general vocabulary or as more suitably described by the adapted class vocabulary.

In accordance with the various embodiments disclosed herein, there is provided a method, apparatus and article of manufacture therefor, for assigning one of a plurality of classes to an input image by: identifying a plurality of key-patches in the input image; computing a feature vector for each of (at least ones of) the plurality of key-patches; computing a histogram for each of (at least ones of) the plurality of classes using the plurality of feature vectors computed; and assigning at least one of the plurality of classes to the input image using the plurality of histograms computed as input to a classifier.

In accordance other of the various embodiments disclosed herein, there is provided a method, apparatus and article of manufacture therefor, for training a classifier, that includes: identifying key-patches in images of a plurality of class training sets; computing feature vectors for the identified key-patches; computing a general vocabulary by clustering the computed feature vectors; for each of a plurality of classes, computing an adapted vocabulary using the general vocabulary; computing a histogram for each of the plurality of classes; training the classifier using the histograms for each of the plurality of classes.

BRIEF DESCRIPTION OF THE DRAWINGS

These and other aspects of the disclosure will become apparent from the following description read in conjunction with the accompanying drawings wherein the same reference numerals have been applied to like parts and in which.

DETAILED DESCRIPTION

A. Definition Of Terms

The terms defined below have the indicated meanings throughout this application, including the claims and the figures:

"Image" is used herein to mean a bitmapped image or a collection of bitmapped images with pixels having a resolution and a pixel depth. Standards for recording bitmapped images include JPEG, GIF, BMP, TIFF, etc. Bitmapped images may be produced (e.g., by rendering vector graphics) or recorded (e.g., using a digital camera).

"Image categorization or classification" is used herein to mean the assignment of an image to one of a plurality of categories or classes (i.e., a mapping that assigns labels to observations). Each category may represent different classes of objects (e.g., trees, cars, animals, etc.) at different levels of generality or specificity (e.g., for the general category of animals, subclasses of cats, dogs, etc.).

B. Training Of Image Classifier

Figure 1:
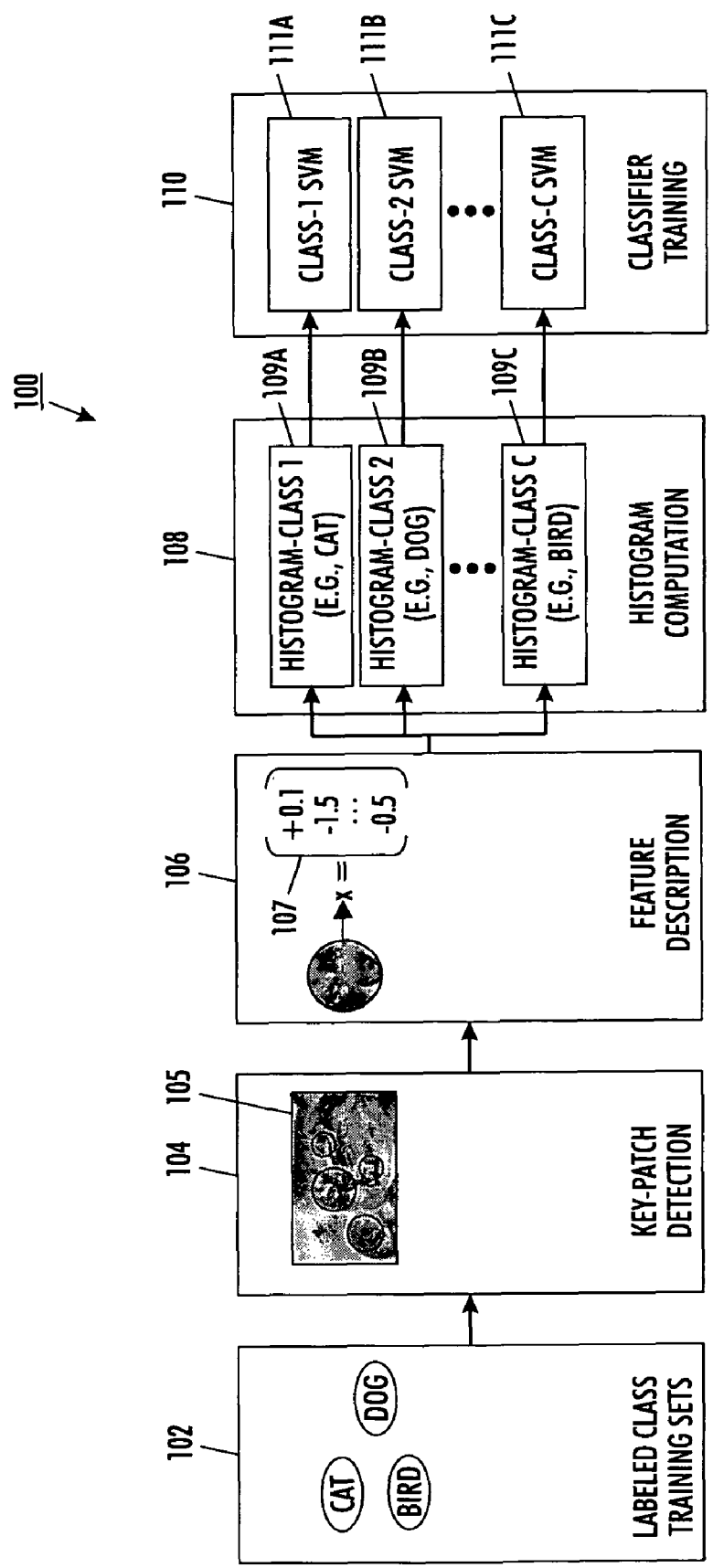
FIG. 1 illustrates elements of a system for performing image categorization training in accordance with the embodiments disclosed herein.
Figure 2:
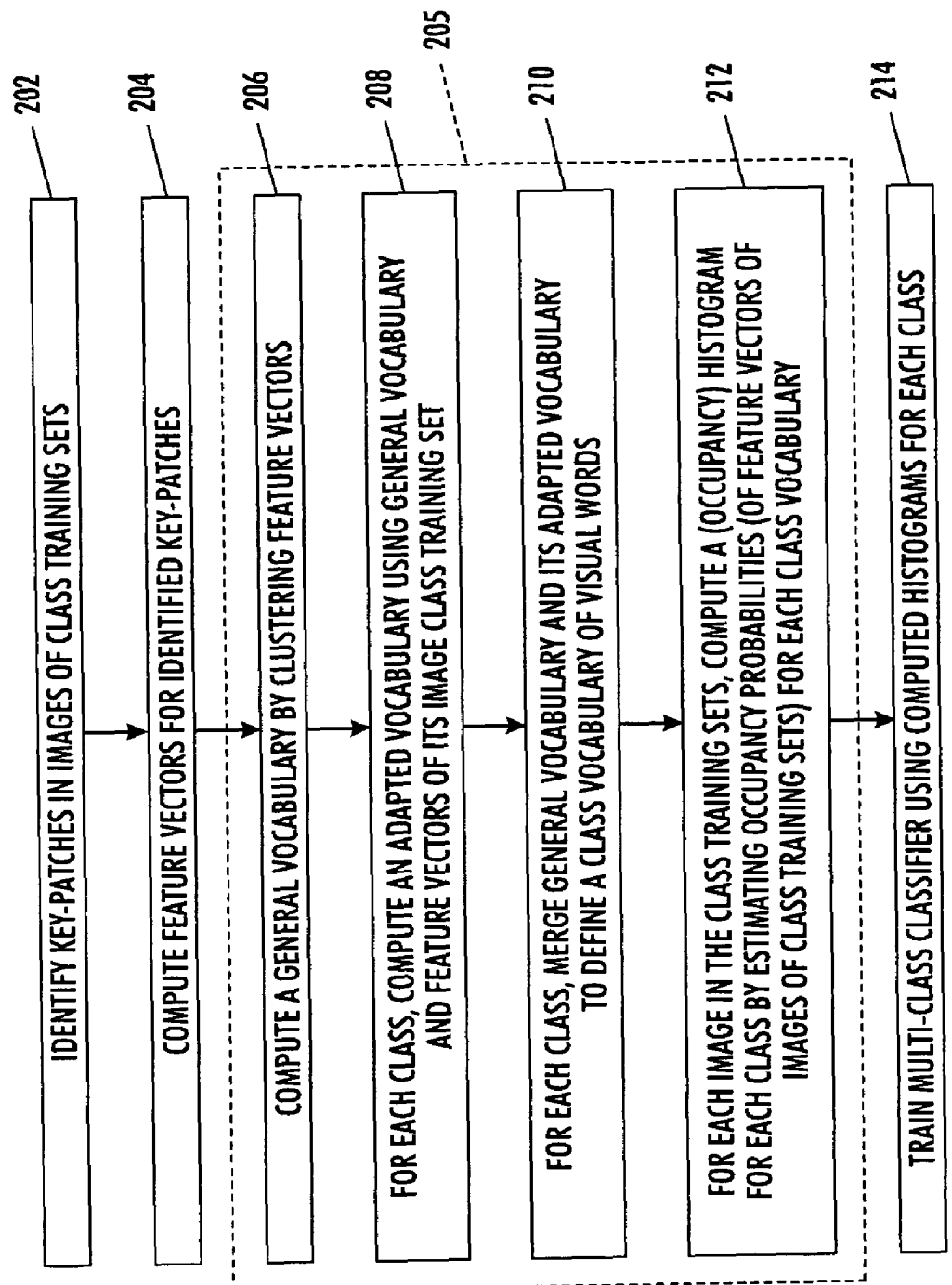
FIG. 2 illustrates a flow diagram of operations performed by the system elements shown in FIG. 1.
Figure 3:
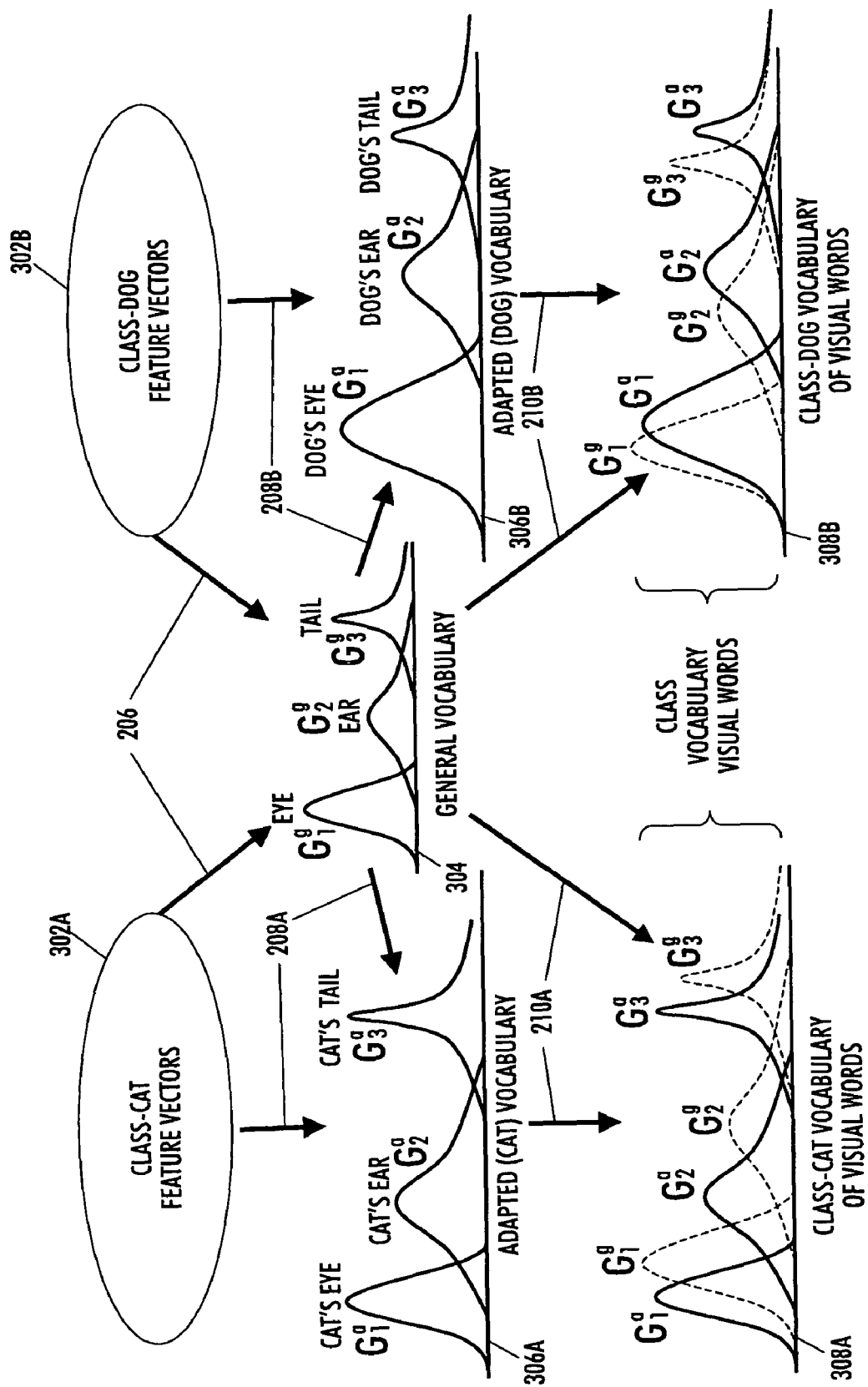
FIG. 3 is an illustrative flow diagram for generating class vocabularies in accordance with the embodiments described herein.

FIGS. 1, 2, and 3 concern the training of an image classifier, which figures are cross-referenced in this section. FIG. 1 illustrates elements of a system 100 for performing image classification training in accordance with the embodiments disclosed herein. FIG. 2 illustrates a flow diagram of operations performed by the system elements shown in FIG. 1. FIG. 3 is an illustrative flow diagram for generating class vocabularies in accordance with the embodiments described herein.

The system 100 includes a memory 102 for storing one or more class training sets. Each class training set is made up of one or more images labeled with an identifier of the class. Preferably, the memory 102 includes a large number of training samples for each class, thereby permitting a distribution of its visual words to be represented in an "average image". The classes may represent elements of an ontology that may be unorganized (e.g., flat) or organized (e.g., in a hierarchy), or a combination of both. In one embodiment, the ontology may be formulated using for example the DMOZ ontology (defined at dmoz.org).

At 202, a key-patch detector 104 identifies key-patches in images of the class training sets stored in memory 102. The key-patch detector 104 should preferably detect repeatable, invariant regions in images. Namely, it is desirable that the key-patch detector 104 be adapted to detect similar features regions as an object undergoes transformations between images (such as in viewpoint, imaging, or lighting). In one embodiment, the key-patch detector 104 is a Harris affine detector (as described by Mikolajczyk and Schmid, in "An Affine Invariant Interest Point Detector", ECCV, 2002, and "A Performance Evaluation Of Local Descriptors", in IEEE Conference on Computer vision and Pattern Recognition, June 2003, which are incorporated herein by reference in their entirety).

In operation, the Harris affine detector detects in an image a circular region of points (as illustrated in FIG. 1 by circles on image 105) using an iterative two-part process. In a first part, positions and scales of interest points are determined as local maxima (in position) of a scale-adapted Harris function, and as local extrema in scale of the Laplacian operator. In a second part, an elliptical (i.e., affine) region is determined, which elliptical region has a size given by the selected scale and a shape given by the eigenvalues of the image's second moment matrix. The first and second parts are then iterated and the elliptical region is kept only if the process converges within a fixed number of iterations. The elliptical region is then mapped to a circular region normalized according to scale, orientation, and illumination.

In other embodiments, alternate detectors may be used to identify key-patches in images of the class training sets stored in memory 102. Examples of such alternate detectors are set forth by Mikolajczyk, Tuytelaars, Schmid, Zisserman, Matas, Schaffalitzky, Kadir, Van Gool, in "A Comparison Of Affine Region Detectors", International Journal of Computer Vision, 2005 (available on the Internet at http://lear.inrialpes.fr/pubs/), which is incorporated herein in its entirety by reference.

At 204, a feature description module 106 computes (unordered) feature vectors (as illustrated in FIG. 1 at 107) for the key-patches identified at 202. In one embodiment, Scale Invariant Feature Transform (SIFT) descriptors (as described by Lowe, in "Object Recognition From Local Scale-Invariant Features", ICCV (International Conference on Computer Vision), 1999, which is incorporated herein by reference in its entirety) are computed on the (circular) region(s) of an image detected by the key-patch detector 104 (e.g., normalized Harris affine regions). SIFT descriptors are multi-image representations of an image neighborhood. More specifically, SIFT descriptors are Gaussian derivatives computed at eight orientation planes over a four-by-four grid of spatial locations, giving a 128-dimensional vector.

In other embodiments, alternate descriptors may be computed on the regions of an image detected by the key-patch detector 104. Examples of such alternate descriptors are set forth by K. Mikolajczyk and C. Schmid, in "A Performance Evaluation Of Local Descriptors", Proceedings of the Conference on Computer Vision and Pattern Recognition (CVPR), Madison, Wis., USA, June 2003, which is incorporated in its entirety by reference.

At 205, a multi-histogram computation module 108 generates histograms from (unordered) feature vectors produced by module 106 by performing 206, 208, 210, and 212, which are discussed in more detail below. The histograms produced by the multi-histogram computation module 108 represent fixed length feature vectors for use with a machine learning classification method employed by classifier training module 110. In one embodiment, the machine learning classification method is a Support Vector Machine (SVM) classifier described in more detail below. In alternate embodiments, the classifier trained at 110 may be any discriminative classifier (i.e., a classifier that models class boundaries), such as Fisher kernels (FK), or neural networks.

At 206, a general vocabulary is estimated by clustering the feature vectors computed at 204. Assuming that the feature vectors may be modeled according to a probability density function (pdf) p, clustering may be performed by maximizing the likelihood function $p(X|\lambda_g)$ with respect to the parameters $\lambda_g = \{w_{i,g}, \mu_{i,g}, C_{i,g}\}$ of the general vocabulary defined below, where $X$ is the set of feature vectors $\{x_1, \ldots, X_N\}$ of the training images 102. Further, assuming that the feature vectors are independent, the likelihood function may be defined as:

$$p(X|\lambda_g) = \prod_{t=1}^{N} p(x_t|\lambda_g). \qquad [1]$$

In one embodiment, the pdf is a Gaussian Mixture Model (GMM) given by:

$$p(x_t|\lambda_g) = \sum_{i=1}^{M} w_{i,g} p_{i,g}(x_t),$$

where M is the number of mixture components and the $w_{i,g}$'s are the mixture weights and are subject to the constraint: $w_{i,g} \geq 0$ for all i and $\sum_{i=1}^{M} w_{i,g} = 1$, and where each component density $p_{i,g}$ is a D-variate Gaussian function of the form:

$$p_{i,g}(x_t) = \frac{1}{(2\pi)^{D/2}|C_{i,g}|^{1/2}} \exp\left\{-\frac{1}{2}(x_t - \mu_{i,g})^T C_i^{-1}(x_t - \mu_{i,g})\right\},$$

where:

D is the dimension of the feature vectors $x_t$;

$\mu_{i,g}$ is the D-dimensional mean vector of the i-th Gaussian of the general vocabulary;

$C_{i,g}$ is the D×D covariance matrix of the i-th Gaussian of the general vocabulary;

$|.|$ is the determinant operator and $.^T$ is the transposition operator.

The parameters $\lambda_g = \{w_{i,g}, \mu_{i,g}, C_{i,g}\}$ Of the general vocabulary may, in one embodiment, be iteratively estimated using Expectation-Maximization (EM) (for background on EM see Dempster, Laird, and Rubin, "Maximum Likelihood From Incomplete Data Via The EM Algorithm", Journal of the Royal Statistical Society, vol. 39(1), pp. 1-38, 1977, which is incorporated herein by reference). A vocabulary with one Gaussian may be initialized using a set of closed formulas that estimate the parameters of the Gaussian. Subsequently the Gaussian may be split into two Gaussians by introducing a small perturbation in its mean (for background see, Ananth Sankar, "Experiments With A Gaussian Merging-Splitting Algorithm For HMM Training For Speech Recognition", Proceedings of the 1997 DARPA Broadcast News Transcription and Understanding Workshop, pp. 99-104, 1998, which is incorporated herein by reference). EM is iteratively performed until convergence. This process of Gaussian splitting and EM training may then be repeated until a desired number of Gaussians is obtained.

During the E-step of EM, the following occupancy probabilities $\gamma_{i,g}(t)$ are estimated for each feature vector $x_t$ and each Gaussian i of the general vocabulary:

$$\gamma_{i,g}(t) = p(i|x_t, \lambda_g) = \frac{w_{i,g} p_{i,g}(x_t)}{\sum_{j=1}^{M} w_{j,g} p_{j,g}(x_t)}.$$

During the M-step of EM, the following parameter estimates for the general vocabulary are obtained:

$$\hat{w}_{i,g} = \frac{\sum_{t=1}^{N} \gamma_{i,g}(t)}{N},$$

$$\hat{\mu}_{i,g} = \frac{\sum_{t=1}^{N} \gamma_{i,g}(t) x_t}{\sum_{t=1}^{N} \gamma_{i,g}(t)},$$

$$\hat{C}_{i,g} = \frac{\sum_{t=1}^{N} \gamma_{i,g}(t)(x_t - \hat{\mu}_{i,g})^T (x_t - \hat{\mu}_{i,g})}{\sum_{t=1}^{N} \gamma_{i,g}(t)}.$$

More generally, it is noted for the preceding embodiment that: each component density $p_{i,g}$ of the GMM corresponds to a visual word as described herein; the mixture weights $\mu_{i,g}$ are the relative frequencies of the visual words in the visual vocabulary; the mean parameters $\mu_{i,g}$ are the "averages" of the visual words; and the covariance matrices $C_{i,g}$ reflect the variations of the visual words around their averages.

At 208, an adapted vocabulary is computed for each class of the labeled training set stored at 102. In one embodiment, the adapted vocabularies may be estimated using the Maximum A Posteriori (MAP) criterion (for more background on the MAP criterion see the following publication which is incorporated herein by reference: Gauvain and Lee, "Maximum a Posteriori Estimation for Multivariate Gaussian Mixture Observations of Markov Chains", IEEE Trans. on Speech and Audio Processing, Vol. 2, No. 2, April 1994).

More specifically, the adapted vocabulary for a class is computed using the general vocabulary computed at 206 and the feature vectors of the class. The criterion to be maximized in MAP is:

$$p(\lambda_a|X) \propto p(X|\lambda_a) p(\lambda_a), \quad [2]$$

where $\lambda_a$ is the set of parameters of the adapted vocabulary. The difference between MAP and ML estimation lies in the assumption of an appropriate prior distribution $p(\lambda_a)$ of the parameters to be estimated. In one embodiment, the parameters of the prior densities $p(\lambda_a)$ are the parameters of the general vocabulary $\lambda_g = \{w_{i,g}, \mu_{i,g}, C_{i,g}\}$ that are iteratively estimated using EM. The seed visual vocabulary used to initialize EM is the general visual vocabulary.

During the E-step, the occupancy probabilities $\gamma_{i,a}(t)$ are computed for each Gaussian:

$$\gamma_{i,a}(t) = p(i|x_t, \lambda_a) = \frac{w_{i,a} p_{i,a}(x_t)}{\sum_{j=1}^{M} w_{j,a} p_{j,a}(x_t)}.$$

During the M-step, the following estimates for the parameters $\lambda_a$ of the adapted vocabulary are obtained:

$$\hat{w}_{i,a} = \frac{\tau + \sum_{t=1}^{N} \gamma_{i,a}(t)}{M\tau + N},$$

$$\hat{\mu}_{i,a} = \frac{\tau \mu_{i,g} + \sum_{t=1}^{N} \gamma_{i,a}(t) x_t}{\tau + \sum_{t=1}^{N} \gamma_{i,a}(t)},$$

$$\hat{C}_{i,a} = \frac{\tau C_{i,g} + \sum_{t=1}^{N} \gamma_i(t)(x_t - \hat{\mu}_{i,a})^T (x_t - \hat{\mu}_{i,a}) + \tau(\mu_{i,g} - \hat{\mu}_{i,a})(\mu_{i,g} - \hat{\mu}_{i,a})^T}{\tau + \sum_{t=1}^{N} \gamma_i(t)},$$

where $\tau$ is a "relevance factor" which keeps a balance between the prior information brought by the parameters $\lambda_g$ of the general vocabulary, and the new information brought by the training samples $x_t$ used for the adaptation.

Storage required for the adapted vocabularies may be reduced by saving only those Gaussians (i.e., visual words) that have significantly changed compared to the general vocabulary. The significance of the change may be measured using various metrics such as the divergence, the Bhattacharya distance, or the overlap. In alternate embodiments, the adapted vocabularies may be computed using Maximum Likelihood Linear Regression (MLLR), as for example disclosed by Leggetter and Woodland, "Maximum Likelihood Linear Regression for Speaker Adaptation of Continuous Density Hidden Markov Models", Computer Speech and Language, issue 9, pp. 171-185, 1995, which is incorporated herein by reference. In this alternate embodiment, an affine transformation is applied to all components of the adapted vocabularies. Storage required for the adapted vocabularies may be reduced using this alternate embodiment if the number of parameters of the transformation is smaller than the number of Gaussian parameters corresponding to the adapted vocabularies.

At 210, a class vocabulary of visual words for each class is computed by merging the general vocabulary computed at 206 and the adaptive vocabulary computed for its respective class at 208. In the embodiment in which the visual words are represented using Gaussians, the merging of the general vocabulary and an adaptive vocabulary involves adjusting the weight parameter of the Gaussians to reflect the vocabulary size having doubled, thereby requiring the frequency of words of the Gaussians to be each divided by, for example, its relative frequency of occurrence; the other parameters of the Gaussians remain unchanged (e.g., mean and covariance parameters). The set of parameters of the class vocabulary of visual words for class c is denoted $\lambda_c$.

At 212, a histogram is computed for each training image (or alternatively input image 402, as discussed below) for each class by each class-specific histogram calculator 109. In one embodiment, the occupancy probabilities $\gamma_{i,c}(t)$ of each feature vector $x_t$ of an image (e.g., training at 102 or input at 402) is computed for a given class c, using its class vocabulary of M visual words together with the general vocabulary of M visual words:

$$\gamma_{i,c}(t) = p(i|x_t, \lambda_c) = \frac{w_{i,c} p_{i,c}(x_t)}{\sum_{j=1}^{2M} w_{j,c} p_{j,c}(x_t)},$$

where $\gamma_{i,c}(t)$ corresponds to the occupancy probability for the i-th visual word. Once computed for each feature vector $x_t$ of an image, the occupancy probabilities $\gamma_{i,c}(t)$ are summed over t for each visual word to define a histogram $h_c$ for the class c.

FIG. 3 illustrates the generation of class vocabularies in greater detail. To begin, feature vectors for images of class "cat" at 302A and feature vectors for images of class "dog" at 302B are computed at 204. Subsequently at 206, a general vocabulary 304 is generated using both cat feature vectors 302A and dog feature vectors 302B. At 208A and 208B, an adapted vocabulary is generated for each class at 306A and 306B using a general vocabulary 304 and a set of class feature vectors, 302A and 302B, respectively. At 210A and 210B, each resulting adapted vocabulary 306A and 306B is merged with the general vocabulary 304 to define class vocabularies 308A and 308B, respectively.

As illustrated in FIG. 3, the general vocabulary 304 include Gaussians $G_1^g$, $G_2^g$, and $G_3^g$ that represent feature densities of all objects detected in the image classes of feature vectors 302A and 302B, such as, eyes, ears, and tail. The adapted vocabularies 306A and 306B include Gaussians $G_1^a$, $G_2^a$, and $G_3^a$ that represent feature densities of only those objects detected in the image classes of feature vectors 302A and 302B, such as, eyes, ears, and tail, for the classes "cat" and "dog", respectively. The class vocabularies 308A and 308B, which represent the visual words of each class, merge the general-Gaussians 304 and adapted-Gaussians of the adapted vocabulary 306A and 306B for each class, respectively.

Further as illustrated in FIG. 3, the class vocabulary illustrate variations between general visual words and adapted visual words in the parameters of the Gaussians. For example, FIG. 3 illustrates a shift from left-to-right for the class "cat" of the adapted Gaussians $G_1^a$, $G_2^a$, and $G_3^a$ relative to the general Gaussians $G_1^g$, $G_2^g$, and $G_3^g$, whereas for the class "dog" there exists a shift from right-to-left. Accordingly, each class vocabulary is trained on all available animal images (e.g., cats and dogs, which are likely to include visual words of objects in the image such as eyes, ears, and tail), while at the same time each is trained on each class-specific vocabulary (e.g., cat-eyes, cat-ears, cat-tail) by adapting the general vocabulary to class-specific vocabularies.

Advantageously, defining class vocabularies that are concatenations of a general vocabulary and its corresponding adapted vocabulary permits the occupancy histogram (computed at 212) to remain a constant size for each class. In an alternate embodiment, the size of the occupancy histogram may be decreased by a factor of two by merging histograms corresponding to the general and the adapted vocabularies, for example, by computing a visual word-by-word difference ratio.

At 214, a set of SVM classifiers are trained (by the classifier training module 110) using the computed histograms that serve as fixed length feature vectors for each SVM classifier 111. In one embodiment, one SVM is trained for each class or visual category of labeled training images. During training at 214, labeled data (i.e., the histograms computed for each class at 212) from the training images is sent to each classifier for adapting a statistical decision procedure for distinguishing between the visual categories.

Each SVM classifier 111 in the set of SVM classifiers finds a hyperplane that separates two-class data with maximal margin (for background see Christopher Burges, "A Tutorial on Support Vector Machines for Pattern Recognition", in Data Mining and Knowledge Discovery, vol. 2, pp. 121-167, 1998, which is incorporated herein by reference). The margin is defined as the distance of the closest training point to the separating hyperplane. For a given histogram observation h, there may be defined a decision (or classification) function given by:

$$f(h) = \text{sign}(w^T h + b), \quad [5]$$

where w, b represents the parameters of the hyperplane.

As data sets are not always linearly separable, the SVM may introduce an error weighting constant C which penalizes misclassification of samples in proportion to their distance from the classification boundary. Alternatively, the SVM may perform a mapping $\Phi$ from the original data space of X to another feature space. This second feature space may have a high or even infinite dimension. One of the advantages of the SVM is that it can be formulated entirely in terms of scalar products in the second feature space, by introducing the kernel K, which follows:

$$K(u,v) = \Phi(u) \cdot \Phi(v), \quad [6]$$

where both the kernel K and penalty C are problem dependent.

In the kernel formulation, the decision (or classification) function may be expressed as:

$$f(h) = \text{sign}\left(\sum_i y_i \alpha_i K(h, h_i) + b\right), \quad [7]$$

where $h_i$ are training features from computed histograms h, and $y_i$ is the label of $h_i$. In one embodiment, the parameters $\alpha_i$ are typically zero for most i. Alternatively said, the sum in equation 7 may be taken only over a select few of the training feature vectors $h_i$. These feature vectors are known as support vectors. It can be shown that the support vectors are those feature vectors lying nearest to the separating hyperplane. In this embodiment, the input features $h_i$ of equation 7 are the training histograms for each class (at 109) computed at 212 in FIG. 2.

To apply SVM classifiers to multi-class problems, a plurality of SVM classifiers 111 may be trained by module 110 using class-specific histogram calculators 109 computed by module 108, such that each SVM (e.g., SVM 111A 111B, and 111C) evaluates one class against all other classes. That is, given an m-class problem, SVMs are trained, such that each distinguishes images from some category I from images from all the other m-l categories j not equal to i. For example as shown in FIG. 1, the classifier 111A for classifying whether an image is a cat or not a cat is trained using cat-class-specific histogram 109A, which histogram estimates the occupancy probabilities of feature vectors of images of the cat-class training set.

C. Application Of Image Classifier

Figure 4:
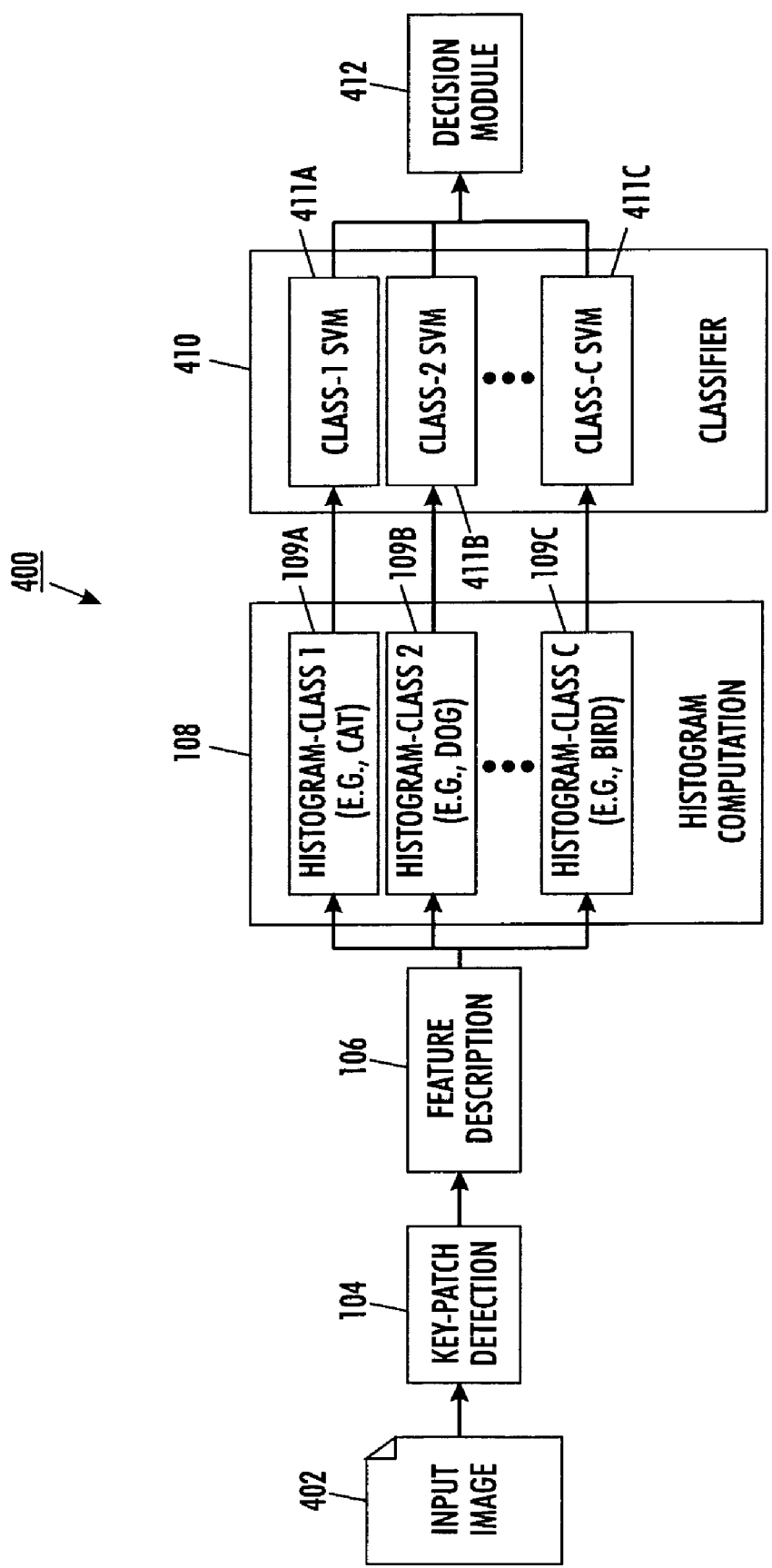
FIG. 4 illustrates elements of a system for performing image categorization in accordance with the embodiments disclosed herein.
Figure 5:
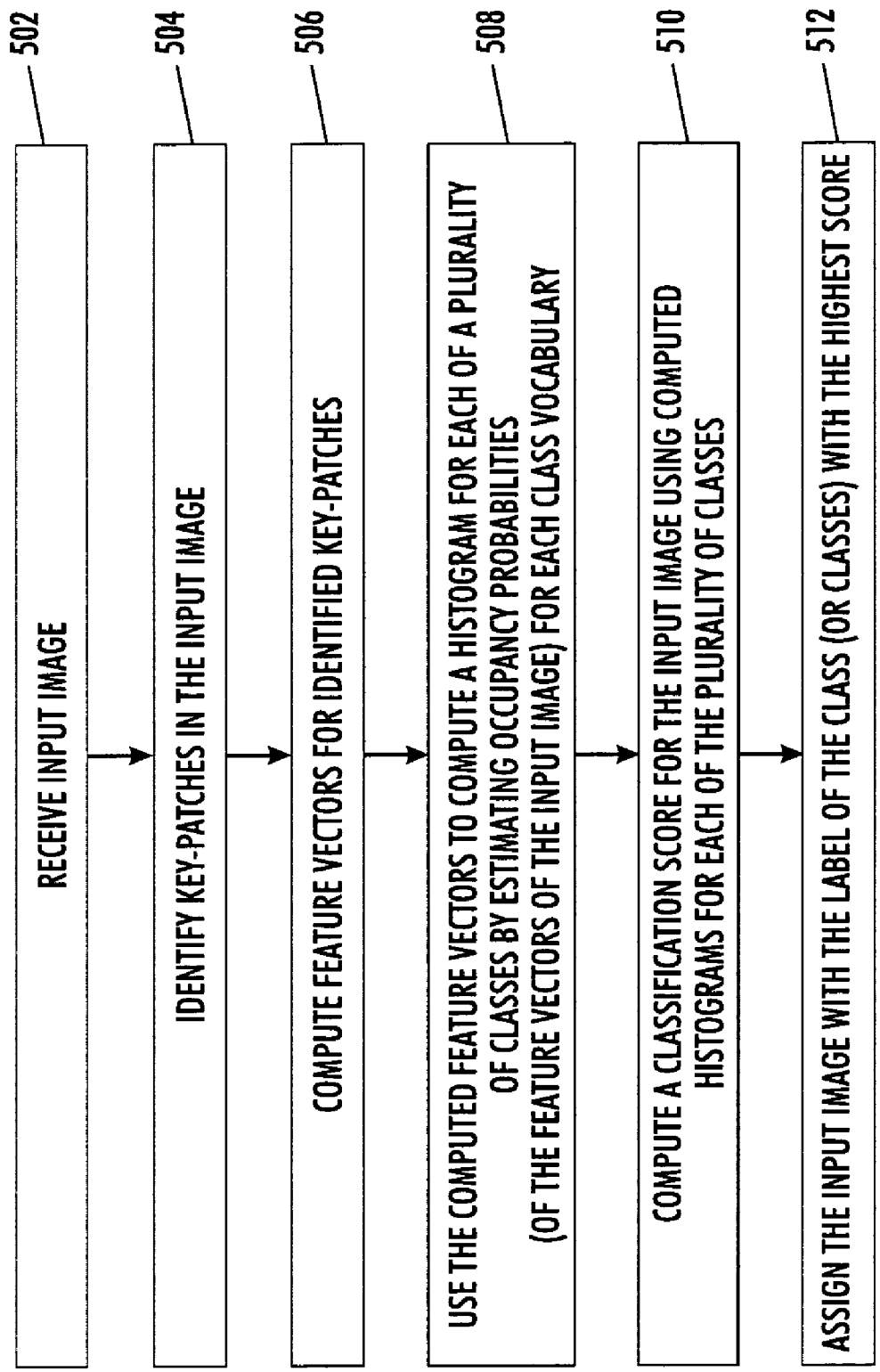
FIG. 5 illustrates a flow diagram of operations performed by the system elements shown in FIG. 4.
Figure 6:
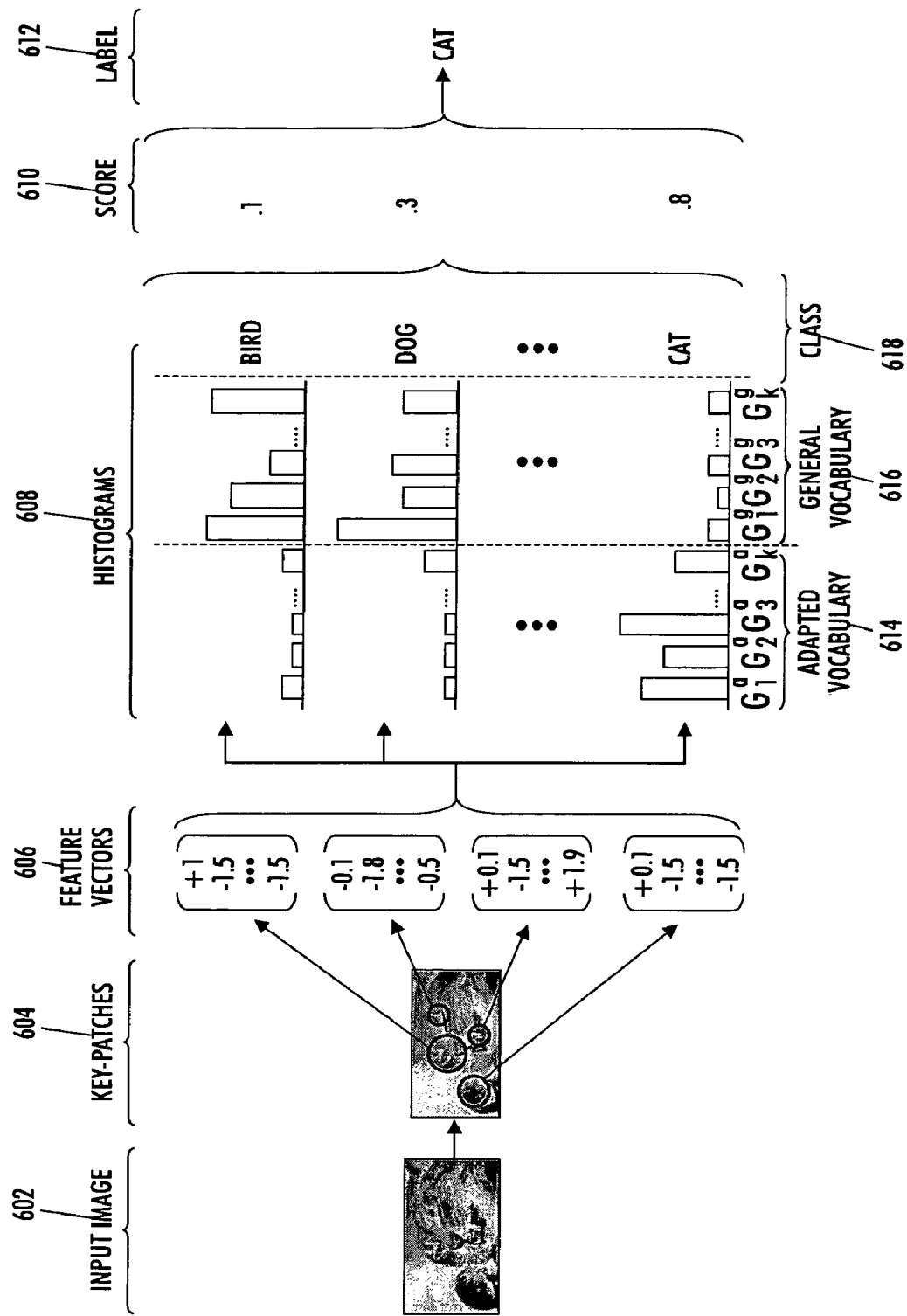
FIG. 6 is an illustrative flow diagram for categorizing an input image in accordance with the embodiments described herein.

FIGS. 4, 5, and 6 concern the use of the image classifier trained in FIGS. 1-3, which FIGS. 4-6 are cross-referenced in this section. FIG. 4 illustrates elements of a system 400 for performing image classification in accordance with the embodiments disclosed herein. Common elements in FIGS. 1 and 4 are labeled with similar reference numbers. FIG. 5 illustrates a flow diagram of operations performed by the system elements shown in FIG. 4. FIG. 6 is an illustrative flow diagram for categorizing an input image in accordance with the embodiments described herein.

At 502, an input image 402 is received for categorization. At 504, key-patches are identified in the input image using key-patch detector 104 that operates on the input image 402 (as at 202 described above for the labeled class training sets 102). At 506, feature vectors are computed by the feature detection module 106 for identified key-patches (as at 204 described above). At 508, a histogram is computed by the multi-histogram computation module 108 for each class vocabulary (computed at 206, 208, and 210) using the computed feature vectors (as at 212 described above). Each class histogram estimates the occupancy probability of the feature vectors of the input image for each class vocabulary.

At 510, each SVM 411 of a classifier 410, trained as set forth above at 214, computes a categorization score corresponding to the histogram of its class vocabulary computed by its class-specific histogram calculators 109, respectively. The categorization score reflects the probability that the detected key-patches belong to one of the labeled class training sets 102. Once each SVM 411 of the classifier 410 computes a score at 508, a decision module 412 (which may be incorporated as part of the classifier 410) assigns the input image 402 to have a label (or set of labels) associated with the class (or set of classes) corresponding to the class (or classes) of the SVM(s) 411 producing the highest score(s).

FIG. 6 is an illustrative example of categorization performed in accordance with the flow diagram set for in FIG. 5. At 604, key-patches are identified in an input image 602 (i.e., more generally at 504). Subsequently, feature vectors 606 are computed for each identified key-patch (i.e., more generally at 506). The set of feature vectors 606 are then used to compute histograms 608 that estimate occupancy probabilities with respect to the adapted vocabulary 614 and the general vocabulary 616, corresponding to each class 618 (i.e., more generally at 508). A score 610 is computed for each histogram 608 (i.e., more generally at 510). A label 612 is assigned to the image to provide the categorization decision based on the best score 610 for the class 618 (i.e., more generally at 512).

In addition, FIG. 6 illustrates how each class-histogram may be split into two sub-histograms of equal size, where the first half of each histogram records the feature densities for the adapted vocabulary 614 and the second half of each histogram records the feature densities of the general vocabulary 616. Also, FIG. 6 illustrates that the histogram for the class "cat" has an adapted vocabulary 614 in which the feature densities of feature vectors of key-patches identified in the input image 402 for the adapted vocabulary 614 (i.e., $G_1^a$, $G_2^a$, and $G_3^a$) are much greater than that of the corresponding general vocabulary 616 ($G_1^g$, $G_2^g$, and $G_3^g$), indicating that the key-patches are much closer to cat features (e.g., eyes, ear, tail) than features describing all image classes. In contrast to the "cat" class, the histograms 608 computed for the "bird" and "dog" classes illustrate that the feature densities of feature vectors of key-patches identified in the input image 402 for the adapted vocabulary 614 are much less than that of the corresponding general vocabulary 616, indicating that the key-patches are much closer to features describing all image classes than the specific "bird" or "dog" classes.

In one embodiment, scoring is performed at 508 and 510 using a two-step procedure, which begins by first determining which visual word of the general vocabulary corresponds closest to a given a feature vector for an input image. The feature vector may, for example, represent features such as an animal's ears, eyes, and tail. Subsequently after determining that a feature vector corresponds to a visual word of the general vocabulary, a determination is made identifying which adapted vocabulary (or class) that visual word most closely corresponds. For example, if the feature vector is determined to correspond to the "eye" visual word of the general vocabulary, it is subsequently determined whether the "eye" feature vector is more likely to be that of a "cat" or a "dog".

More specifically with reference again to FIG. 3, the two-step scoring procedure, in the first step, may compute for each feature vector of a given input image, the occupancy probability for only the top K scoring Gaussians in the general vocabulary (while assuming the occupancy probability for any other lesser scoring Gaussian is zero). In the second step, the occupancy probability may be computed for those corresponding top K scoring Gaussians in each adapted vocabulary. (Additional background for the scoring procedure is disclosed by Reynolds, Quatieri and Dunn, in "Speaker Verification Using Adapted Gaussian Mixture Models", Digital Signal Processing, Vol. 10, pp. 19-41, 2000, which is incorporated herein by reference.)

D. Miscellaneous

As disclosed above, the method, apparatus and article of manufacture therefor, for generic visual categorization complements a general (visual) vocabulary with adapted (visual) vocabularies that are class (or category) specific. Images are characterized within each class (or category) through a histogram indicating whether the image is better described by the general vocabulary or the class-specific adapted vocabulary. Advantageously, defining a generic vocabulary and adapting it to different class specific categories through histograms based on a mixture of both vocabularies permits the appropriateness of both vocabularies to be captured.

Those skilled in the art will recognize that a general purpose computer may be used as an apparatus for training and using the elements of the generic visual categorizer shown in FIGS. 1 and 4 and described herein. In addition, those skilled in the art will recognize that the systems 100 and 400 may operate as separate systems or together as a single system. Such a general purpose computer would include hardware and software. The hardware would comprise, for example, memory (ROM, RAM, etc.) (e.g., for storing processing instructions of the categorization system detailed in FIGS. 2 and 5), a processor (i.e., CPU) (e.g., coupled to the memory for executing the processing instructions), persistent storage (e.g., CD-ROM, hard drive, floppy drive, tape drive, etc.), user I/O, and network I/O. The user I/O may include a camera, a microphone, speakers, a keyboard, a pointing device (e.g., pointing stick, mouse, etc.), and the display. The network I/O may for example be coupled to a network such as the Internet. The software of the general purpose computer would include an operating system and application software providing the functions of the generic visual categorization system.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for assigning one of a plurality of classes to an input image, comprising one or more processors implementing the following actions:
   identifying by a key patch detector a plurality of key-patches in the input image;
   computing by a feature description module an unordered feature vector for each of the plurality of key-patches;
   computing by a multi-histogram computation module a first histogram of fixed length feature vectors for each of the plurality of classes using the plurality of unordered feature vectors computed;
   computing by the multi-histogram computation module a second histogram for each of the plurality of classes using the plurality of unordered feature vectors computed and the first histogram of fixed length feature vectors computed; and,
   assigning by a classifier training module at least one of the plurality of classes to the input image using the plurality of histograms computed as input to a classifier;
   wherein the first and second histograms are iteratively estimated using an Expectation-Maximization based calculation for mixture weight, mean vector, and covariance matrix parameters of the feature vector, wherein the parameters correspond to relative frequencies, averages, and variations of the visual words.

2. The method according to claim 1, wherein each histogram is computed by estimating occupancy probabilities of the feature vectors of the input image for each class vocabulary.

3. The method according to claim 2, further comprising defining each class vocabulary by merging a general vocabulary and an adapted vocabulary for each class.

4. The method according to claim 3, wherein the histogram computed for each of the plurality of classes indicates whether the input image is better described by the general vocabulary or the adapted vocabulary of its corresponding class.

5. The method according to claim 4, further comprising: computing key-patches in images of class training sets; computing feature vectors for key-patches of the images of the class training sets; computing the general vocabulary by clustering feature vectors of the images of class training sets; computing each class' adapted vocabulary by estimating occupancy probabilities, of the feature vectors of the images of its class training set, for each class vocabulary.

6. The method according to claim 5, further comprising training the classifier with histograms computed for each class by estimating occupancy probabilities, of the feature vectors of images of the class trainings set, for each class vocabulary.

7. The method according to claim 2, wherein said assigning further comprises: computing a score for the input image for each of the plurality of classes using its computed histogram; assigning the input image a label corresponding to the class with the highest computed score.

8. The method according to claim 7, wherein said computing computes the score using a Support Vector Machine classifier for each class.

9. An apparatus for processing an assignment of one of a plurality of classes to an input image, comprising:
   a memory which stores:
      a key-patch detector identifying a plurality of key-patches in the input image;
      a feature description module for computing an unordered feature vector for each of the plurality of key-patches;
      a multi-histogram computation module computing a first histogram of fixed length feature vectors for each of the plurality of classes using the plurality of unordered feature vectors computed;
      the multi-histogram computation module computing a second histogram of each of the plurality of classes using the plurality of unordered feature vectors computed and the first histogram of fixed length feature vectors computed;
      wherein the first and second histograms are iteratively estimated using an Expectation-Maximization based calculation for mixture weight, mean vector, and covariance matrix parameters of the feature vector, wherein the parameters correspond to relative frequencies, averages, and variations of the visual words a classifier for assigning at least one of the plurality of classes to the input image using the plurality of histograms computed as input to the classifier; and a processor in communication with the memory configured for processing the image with the key-patch detector, the feature description module, the multi-histogram computation module, and the classifier.

10. The apparatus according to claim 9, wherein the multi-histogram computation module computes each histogram by estimating occupancy probabilities of the feature vectors of the input image for each class vocabulary.

11. The apparatus according to claim 10, wherein the multi-histogram computation module defines each class vocabulary by merging a general vocabulary and an adapted vocabulary for each class.

12. The apparatus according to claim 11, wherein the histogram computed by the multi-histogram computation module for each of the plurality of classes indicates whether the input image is better described by the general vocabulary or the adapted vocabulary of its corresponding class.

13. The apparatus according to claim 10, wherein the key-patch detector computes key-patches in images of class training sets; the feature description module computes feature vectors for key-patches of the images of the class training sets; the multi-histogram computes: the general vocabulary by clustering feature vectors of the images of class training sets, and each class' adapted vocabulary by estimating occupancy probabilities, of the feature vectors of the images of its class training set, for each class vocabulary.

14. The apparatus according to claim 13, further comprising a classifier training module for training the classifier with histograms computed for each class by estimating occupancy probabilities, of the feature vectors of images of the class trainings set, for each class vocabulary.

15. The apparatus according to claim 10, wherein the classifier: computes a score for the input image for each of the plurality of classes using its computed histogram; assigns the input image a label corresponding to the class with the highest computed score.

16. The apparatus according to claim 15, wherein the classifier comprises a Support Vector Machine classifier for computing the score for each class.

17. A method for a computer-based system for training a classifier, comprising one or more processors implementing the following actions:

identifying by a key patch detector key-patches in images of a plurality of class training sets;

computing by a feature description module feature vectors for the identified key-patches;

computing by a multi-histogram computation module a general vocabulary by clustering the computed feature vectors;

for each of a plurality of classes, computing by a multi-histogram computation module an adapted vocabulary using the general vocabulary;

comparing the adapted vocabulary to the general vocabulary;

storing by a memory the adapted vocabulary if it is changed as compared to the general vocabulary;

computing by a class-specific histogram calculator a histogram for each of the plurality of classes;

training by a classifier training module the classifier using the histograms for each of the plurality of classes;

wherein the first and second histograms are iteratively estimated using an Expectation-Maximization based calculation for mixture weight, mean vector, and covariance matrix parameters of the feature vector, wherein the parameters correspond to relative frequencies, averages, and variations of the visual words.

18. The method according to claim 17, further comprising categorizing an input image with the image classifier.

19. The method according to claim 18, wherein said categorizing further comprises: identifying a plurality of key-patches in the input image; computing a feature vector for each of the plurality of key-patches; computing a histogram for each of the plurality of classes using the plurality of feature vectors computed; assigning at least one of the plurality of classes to the input image using the plurality of histograms computed as input to the classifier.

20. The method according to claim 19, wherein each histogram is computed by estimating occupancy probabilities of the feature vectors of the input image for each class vocabulary.

* * * * *